(12) United States Patent
Jang et al.

(10) Patent No.: US 11,649,517 B2
(45) Date of Patent: May 16, 2023

(54) HIGH-STRENGTH FE—CR—NI—AL MULTIPLEX STAINLESS STEEL AND MANUFACTURING METHOD THEREFOR

(71) Applicant: KOREA ADVANCED INSTITUTE OF SCIENCE AND TECHNOLOGY, Daejeon (KR)

(72) Inventors: Changheui Jang, Daejeon (KR); Hyunmyung Kim, Daejeon (KR); Gokul Obulan Subramanian, Daejeon (KR); Jin Woo Heo, Daejeon (KR); Ho Jung Lee, Daejeon (KR); Sunghoon Hong, Daejeon (KR); Chaewon Kim, Daejeon (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 7 days.

(21) Appl. No.: 16/083,713

(22) PCT Filed: Sep. 20, 2017

(86) PCT No.: PCT/KR2017/010276
§ 371 (c)(1),
(2) Date: Sep. 10, 2018

(87) PCT Pub. No.: WO2018/074743
PCT Pub. Date: Apr. 26, 2018

(65) Prior Publication Data
US 2020/0056257 A1 Feb. 20, 2020

(30) Foreign Application Priority Data

Oct. 21, 2016 (KR) .......... 10-2016-0137357
Aug. 4, 2017 (KR) .......... 10-2017-0098767

(51) Int. Cl.
*C21D 9/46* (2006.01)
*C21D 6/00* (2006.01)
(Continued)

(52) U.S. Cl.
CPC ............ *C21D 9/46* (2013.01); *C21D 6/004* (2013.01); *C21D 8/0205* (2013.01);
(Continued)

(58) Field of Classification Search
CPC ........ C21D 9/46; C21D 6/004; C21D 8/0205; C21D 8/0226; C21D 8/0236;
(Continued)

(56) References Cited

U.S. PATENT DOCUMENTS 4,080,204 A * 3/1978 Panzera .................. C22C 38/40
75/229
2005/0274439 A1* 12/2005 Gschneidner, Jr. ... C01B 3/0068
148/400

(Continued)

FOREIGN PATENT DOCUMENTS

| CN | 1599803 | 3/2005 |
| CN | 105154793 | 12/2015 |

(Continued)

OTHER PUBLICATIONS

Datta et al., "Corrosion of Intermetallics", 2005, ASM International, ASM Handbook, vol. 13B: Corrosion: Materials, pp. 490-512 (Year: 2005).*

(Continued)

*Primary Examiner* — Keith Walker
*Assistant Examiner* — Adil A. Siddiqui
(74) *Attorney, Agent, or Firm* — Duane Morris LLP; Gregory M. Lefkowitz; Brandon A. Chan

(57) ABSTRACT

The present disclosure relates to a high-strength Fe—Cr—Al—Ni multiplex stainless steel and a manufacturing
(Continued)

method therefor. The multiplex stainless steel comprises 35 to 67 wt % of iron (Fe), 13 to 30 wt % of chrome (Cr), 15 to 30 wt % of nickel (Ni), and 5 to 15 wt % of aluminum (Al) and has a multiplex structure in which an austenite phase accounting for high ductility, a ferrite phase accounting for high strength, and an NiAl(B2) phase providing both strength and high-temperature steam oxidation resistance, exist in combination. The multiplex stainless steel can secure necessary fabricability and mechanical strength even if for/in a thin state, can maintain integrity as a structural member in a normal operation condition of a light-water reactor thanks to the formation of a chrome oxide layer thereon, and can form a stable oxide layer including alumina under a high-temperature steam environment, which is plausible in a high-temperature nuclear accident, thereby providing exceptionally improved resistance to serious accidents.

8 Claims, 5 Drawing Sheets

(51) Int. Cl.
| | |
|---|---|
| *C21D 8/02* | (2006.01) |
| *C22C 38/02* | (2006.01) |
| *C22C 38/04* | (2006.01) |
| *C22C 38/06* | (2006.01) |
| *C22C 38/48* | (2006.01) |
| *C22C 38/50* | (2006.01) |
| *C22C 38/18* | (2006.01) |

(52) U.S. Cl.
CPC .......... *C21D 8/0226* (2013.01); *C21D 8/0236* (2013.01); *C21D 8/0263* (2013.01); *C22C 38/02* (2013.01); *C22C 38/04* (2013.01); *C22C 38/06* (2013.01); *C22C 38/18* (2013.01); *C22C 38/48* (2013.01); *C22C 38/50* (2013.01); *C21D 2211/001* (2013.01); *C21D 2211/004* (2013.01); *C21D 2211/005* (2013.01)

(58) Field of Classification Search
CPC ............ C21D 8/0263; C21D 2211/001; C21D 2211/004; C21D 2211/005; C21D 8/00; C22C 38/02; C22C 38/04; C22C 38/06; C22C 38/48; C22C 38/50; C22C 38/34; C22C 38/40; C22C 38/18; Y02E 30/30; G21C 3/07

See application file for complete search history.

(56) References Cited

U.S. PATENT DOCUMENTS

| | | |
|---|---|---|
| 2010/0054983 A1 | 3/2010 | Osuki et al. |
| 2014/0185733 A1 | 7/2014 | Povirk et al. |

FOREIGN PATENT DOCUMENTS

| | | | | |
|---|---|---|---|---|
| JP | 06-146011 | | 5/1994 | |
| JP | 07-310144 | | 11/1995 | |
| JP | 09-263906 | | 10/1997 | |
| JP | 05797461 | | 10/2015 | |
| JP | 2016125088 A | * | 7/2016 | ............ C22C 19/05 |
| KR | 1017791280000 | | 9/2017 | |
| WO | 03/029505 | | 4/2003 | |
| WO | 2004/087980 | | 10/2004 | |
| WO | WO-2004087980 A1 | * | 10/2004 | ............ C22C 38/06 |

OTHER PUBLICATIONS

Yamada et al., "Effect of heat treatment on the structure and hardness of FeCrNi alloys", 1993, Journal of Materials Science, vol. 28, pp. 5863-5868 (Year: 1993).*

JP-2016125088-A: Espacenet English machine translation (Year: 2016).*

* cited by examiner

HIGH-STRENGTH FE—CR—NI—AL MULTIPLEX STAINLESS STEEL AND MANUFACTURING METHOD THEREFOR

TECHNICAL FIELD

The present disclosure relates to high-strength Fe—Cr—Ni—Al multiplex stainless steel which is stainless steel having a multiplex structure including an austenite phase, ferrite phase and NiAl(B2) phase in combination and containing 5 wt % or more of aluminum, and a method for manufacturing the material. The high-strength Fe—Cr—Ni—Al multiplex stainless steel shows excellent mechanical properties, forms a stable oxide layer under the water chemistry and high-temperature steam environment in a pressurized water reactor, thereby providing high oxidation resistance in a normal operation and accidental environment of a light water reactor.

BACKGROUND ART

When an accident occurs in nuclear fuel claddings, supporting grids or nuclear reactor structures used for a nuclear fuel assembly in an atomic power plant, they generate hydrogen byproducts resulting from oxidation of metal under a high-temperature environment, cause emission of radioactive substances due to the melting of a reactor core, and result in risk of reactor containment building damage. Particularly, the zirconium (Zr) metal used currently as a nuclear fuel cladding material in a light water reactor core undergoes accelerated high-temperature oxidation under a high-temperature steam environment when a serious accident occurs, thereby accelerating the collapse of the nuclear reactor core. In the case, the reactor core materials other than the cladding also have a significant effect upon the phenomena of molten products of the reactor core generated upon a serious accident (melt core-coolant interaction (MCCI), fuel-coolant interaction (FCI), direct containment heating (DCH), or the like). Therefore, active studies have been conducted for the development of materials which can ensure safety upon an accident.

In accordance with the requirements for ensuring safety in an atomic power plant since the Fukushima Daiichi nuclear disaster in 2012, active researches and developments have been conducted about various accident-tolerant reactor core materials, including the iron-based alloy material and the surface-coated/ODS Zr cladding, by various educational and industrial organizations under the supervision of the Korea Atomic Energy Research Institute (KAERI) in Korea and the Oak Ridge National Laboratory (ORNL) in the USA.

Unlike other materials which are being developed for a similar purpose as a candidate substitute for the commercially available Zr alloy cladding, the Fe-based alloy material is made of a single material (cast) and thus shows constant physical parameters inside of the cladding. Thus, the material allows relatively easy designing of the cladding. Also, it is an economical material since the raw material is relatively cheap as compared to Zr. In addition, the Fe-based chromium (Cr)-aluminum (Al) alloy material is advantageous in that it can significantly improve anticorrosive property through a Cr oxide layer in normal situations and high-temperature oxidation resistance through an Al oxide layer when a serious accident occurs. In addition, the material is advantageous in that it shows excellent mechanical properties as compared to the conventional Zr alloy cladding, thereby improving the distortion and rupture phenomena of the cladding.

However, the FeCrAl alloy shows deterioration of mechanical properties due to thermal embrittlement of the single ferrite structure. It is expected that the FeCrAl alloy is not amenable to the manufacture and application of a thin nuclear fuel cladding due to its limited mechanical fabricability and bonding property. In addition, it is expected that a considerable time will be required until the nuclear fuel cladding surface-coated with a metal and the ceramic-based SiC composite cladding can be applied to the industrial fields. Therefore, it is required to develop a novel oxidation-resistant metallic material to increase the safety of the reactor core and to eliminate the risk caused by hydrogen explosion even in an accidental situation, in order to ensure the safety of the currently operating light water reactor.

DISCLOSURE

Technical Problem

A technical problem to be solved by the present disclosure is to provide a high-strength Fe—Cr—Ni—Al multiplex stainless steel for an accident-tolerant reactor core material which can provide excellent oxidation resistance through the formation of a stable oxide layer containing alumina under high-temperature steam environment that may be generated upon a serious accident in a light water reactor, and can ensure excellent mechanical properties and excellent anti-corrosive property through the formation of a chromia oxide layer under the water chemistry environment of a normally operating pressurized light water reactor.

Another technical problem to be solved by the present disclosure is to provide a method for manufacturing the high-strength Fe—Cr—Ni—Al multiplex stainless steel for an accident-tolerant reactor core material.

Technical Solution

In one general aspect, there is provided high-strength stainless steel for an accident-tolerant light water reactor core material which includes 35-67 wt % of iron (Fe), 13-30 wt % of chromium (Cr), 15-30 wt % of nickel (Ni) and 5-15 wt % of aluminum (Al) and has a structure including an austenite phase, ferrite phase and a NiAl(B2) phase.

Preferably, the stainless steel includes aluminum in an amount of 5.5-15 wt %.

The stainless steel may further include at least three elements selected from the group consisting of 0.1-2 parts by weight of niobium (Nb), 0.1-2 parts by weight of manganese (Mn), 0.03-0.2 parts by weight of carbon (C), 0.1-1.0 parts by weight of silicon (Si), 0.01 parts by weight or less of phosphorus (P) and 0.01 parts by weight or less of sulfur (S), based on 100 parts by weight of the combination of iron (Fe), chromium (Cr), nickel (Ni) and aluminum (Al).

The stainless steel may include the austenite phase, ferrite phase and the NiAl(B2) phase in a volume ratio of 1:0.1-1.5:0.1-1.0.

In another general aspect, there is provided a method for manufacturing stainless steel for an accident-tolerant light water reactor core material, the method including the steps of: (A) melting 35-67 wt % of iron (Fe), 13-30 wt % of chromium (Cr), 15-30 wt % of nickel (Ni) and 5-15 wt % of aluminum (Al) to provide an ingot; (B) subjecting the ingot to hot rolling at 1050-1250° C.; (C) primarily heat treating the alloy subjected to hot rolling at 700-1200° C., followed by quenching; (D) subjecting the quenched alloy to cold rolling at room temperature; and (E) further heat treating the rolled alloy at 700-900° C., wherein the stainless steel has a structure including an austenite phase, ferrite phase and a NiAl(B2) phase.

Advantageous Effects

The Fe—Cr—Ni—Al multiplex stainless steel according to the present disclosure is a Fe-based alloy containing 5 wt % or more of aluminum, forms a stable oxide layer containing alumina under high-temperature steam environment expected upon an accident in a nuclear power plant to provide excellent accident-tolerance, and can provide excellent integrity as a structural material by virtue of excellent mechanical properties and anticorrosive property during normal operation.

In addition, the stainless steel according to the present disclosure forms a multiplex structure having an austenite phase, ferrite phase and a NiAl(B2) phase in combination, and thus shows higher mechanical properties, fabricability and weldability as compared to single ferrite stainless steel containing a similar amount of aluminum.

BEST MODE

Figure 1:
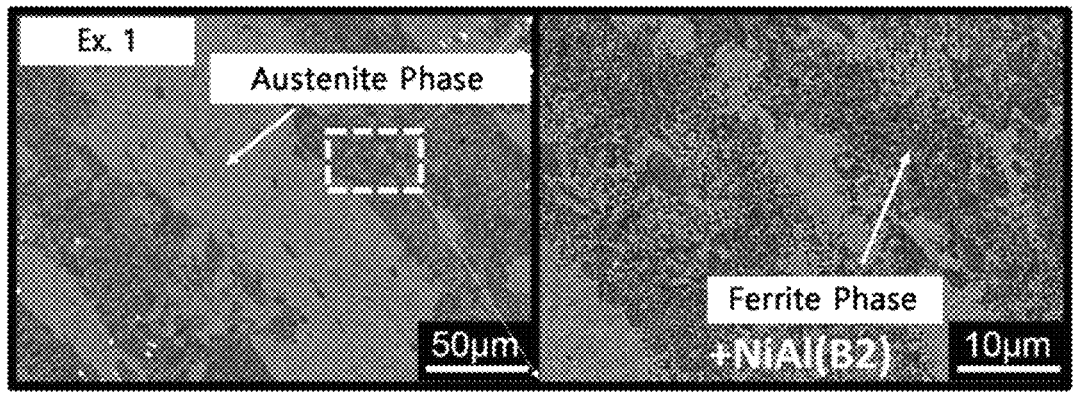
FIG. 1 is a photographic image of the microstructural surface of the stainless steel according to Example 1, taken by scanning electron microscopy (SEM)/back scattered electron detector (BSE)

The present disclosure relates to high-strength Fe—Cr—Ni—Al multiplex stainless steel for an accident-tolerant reactor core material which can provide excellent oxidation resistance through the formation of a stable oxide layer containing alumina under high-temperature steam environment that may be generated upon a serious accident in a light water reactor and can ensure excellent mechanical properties and excellent anticorrosive property through the formation of a chromia oxide layer under the water chemistry environment during the normal operation in a pressurized light water reactor. The present disclosure also relates to a method for manufacturing the high-strength Fe—Cr—Ni—Al multiplex stainless steel for an accident-tolerant reactor core material.

The stainless steel shows the above-mentioned effects since it has a multiplex structure including three phases in combination by virtue of a high aluminum content as compared to the existing commercially available stainless steel.

In general, the conditions required for forming desired phases when manufacturing a stainless steel material are as follows: 1. Content of each composition, and 2. Differentiated manufacturing process. According to the present disclosure, stainless steel having a multiplex structure in which three phases coexist is provided by using a content of each composition different from that of the related art and a differentiated manufacturing process.

According to the present disclosure, there is provided Fe—Cr—Ni—Al multiplex stainless steel having a high (5 wt % or more) aluminum content in order to ensure excellent mechanical properties and excellent anticorrosive property under high-temperature steam and pressurized light water reactor water chemistry environment by using iron (Fe) as a base material and an adequate content of chromium (Cr) and nickel (Ni).

Hereinafter, the present disclosure will be explained in detail.

The high-strength Fe—Cr—Ni—Al stainless steel for an accident-tolerant reactor core material having a multiplex structure includes iron (Fe), chromium (Cr), nickel (Ni) and aluminum (Al), and may further include at least three elements selected from the group consisting of niobium (Nb), manganese (Mn), carbon (C), silicon (Si), phosphorus (P) and sulfur (S).

Referring to each compositional element, iron (Fe) decreases the cost required for manufacturing a nuclear fuel cladding and is used in combination with chromium (Cr), nickel (Ni) and aluminum (Al) to realize a multiplex structure including an austenite phase, ferrite phase and a NiAl (B2) phase.

Iron (Fe) is used in an amount of 35-67 wt %, preferably 42-55 wt %. When the content of iron is less than the lower limit, it is not possible to reduce the cost efficiently as compared to the conventional cladding. When the content of iron is larger than the upper limit, a desired multiplex structure cannot be formed and the mechanical properties may be degraded.

The multiplex structure is a phase including an austenite phase, ferrite phase and a NiAl(B2) phase in combination. According to the present disclosure, the austenite phase, ferrite phase and NiAl(B2) phase are formed in a volume ratio of 1:0.1-1.5:0.1-1.0, preferably in a volume ratio of the austenite phase to the combined phase of the ferrite phase with NiAl(B2) phase [ferrite phase+NiAl(B2) phase] of 1:1.0-1.5. When the three phases are distributed in the above-defined volume ratio, the stainless steel may have preferred high-temperature steam oxidation resistance and excellent mechanical properties, including high strength.

The austenite phase is a structure for improving fabricability.

In addition, the ferrite phase is a structure for improving strength. When the content of ferrite based on the austenite phase is less than the lower limit, it is not possible to satisfy tensile strength and toughness characteristics required for a cladding. When the content of ferrite is larger than the upper limit, elongation may be degraded, thereby adversely affecting the fabricability during the manufacture of a cladding.

In addition, the NiAl(B2) phase is a structure for improving strength and controlling the phase volume ratio. When the content of NiAl(B2) phase based on the austenite phase is less than the lower limit, strength is degraded and the above-defined volume ratio of austenite phase/ferrite phase cannot be accomplished. When the content of NiAl(B2) phase is larger than the upper limit, ductility may be degraded, resulting in degradation of fabricability.

Further, chromium (Cr) is used in combination with nickel (Ni), aluminum (Al) and iron (Fe) to realize a multiplex structure, and is used in combination with aluminum (Al) to allow formation of a stable oxide layer under high-temperature steam environment expected in the condition of an accident in a nuclear power plant. Moreover, in the condition of a normally operating nuclear power plant, a Cr-based oxide layer is formed to provide excellent anticorrosive behavior.

Chromium (Cr) is used in an amount of 13-30 wt %, preferably 15-21 wt %. When chromium is used in an amount less than the lower limit, it is not possible to control the formation of a desired multiplex structure, thereby causing degradation of tensile strength and toughness, and to form a continuous chromium (Cr)-based oxide layer under water chemistry environment of a pressurized light water reactor and a stable alumina oxide layer under high-temperature steam environment. When chromium is used in an amount larger than the upper limit, it is not possible to form the distribution of an austenite phase, ferrite phase and a NiAl(B2) phase disclosed herein, thereby causing problems, such as degradation of fabricability and thermal embrittlement.

In addition, nickel (Ni) is used in combination with chromium (Cr), aluminum (Al) and iron (Fe) to realize a multiplex structure so that the austenite phase, ferrite phase and NiAl(B2) phase may be formed to a desired volume ratio.

Nickel (Ni) is present in an amount of 15-30 wt %, preferably 18-29 wt %. When the nickel content is present in an amount less than the lower limit, the austenite phase is reduced and thus the multiplex structure distribution disclosed herein may not be formed. When the nickel content is present in an amount larger than the upper limit, the ferrite phase is reduced to cause degradation of tensile strength and toughness characteristics and defects caused by radiation embrittlement.

In addition, aluminum (Al) is used in combination with chromium (Cr) to form a stable oxide layer under high-temperature steam environment, and is used in combination with nickel (Ni) to form a NiAl(B2) phase through the thermal-mechanical process disclosed herein, thereby improving mechanical strength.

Aluminum (Al) is present in an amount of 5-15 wt %, preferably 5.5-15 wt %, more preferably 6.1-15 wt %, even more preferably 6.1-10 wt %, and most preferably 6.1-8.0 wt %. When aluminum is present in an amount less than the lower limit, it is not possible to form an alumina oxide layer efficiently upon the exposure to high-temperature steam environment. When aluminum is present in an amount larger than the upper limit, it is not possible to form a multiplex structure distribution disclosed herein and fabricability may be degraded due to solid solution hardening.

In addition, the nuclear fuel cladding according to the present disclosure further includes at least three elements selected from the group consisting of 0.1-2 parts by weight of niobium (Nb), 0.1-2 parts by weight of manganese (Mn), 0.03-0.2 parts by weight of carbon (C), 0.1-1.0 parts by weight of silicon (Si), 0.01 parts by weight or less of phosphorus (P) and 0.01 parts by weight or less of sulfur (S), based on 100 parts by weight of the combination of iron (Fe), chromium (Cr), nickel (Ni) and aluminum (Al). Preferably, each of phosphorus and sulfur may be present in an amount of 0.001-0.01 parts by weight.

The three or more elements selected from the group consisting of niobium (Nb), manganese (Mn), carbon (C), silicon (Si), phosphorus (P) and sulfur (S) can improve physical properties, but participates in formation of the multiplex structure to an insignificant degree, except carbon. In addition, the elements have an insignificant effect upon oxidation behavior. Therefore, when the content of each of niobium (Nb), manganese (Mn), carbon (C), silicon (Si), phosphorus (P) and sulfur (S) is not within the above-defined range, it is not possible to obtain a desired microstructure and mechanical properties.

In another aspect, there is provided a method for manufacturing high-strength stainless steel for an accident-tolerant light water reactor core material having a multiplex structure.

Unlike the recently developed accident-tolerant nuclear fuel cladding which has a multilayer structure using an alloy layer (coating) on the surface of a conventional cladding, the stainless steel according to the present disclosure is obtained in a bulk type metal casting mode through a casting and thermal-mechanical process, like a zirconium alloy, and thus has excellent mechanical properties and oxidation resistance.

The method for manufacturing high-strength stainless steel for an accident-tolerant reactor core material includes the steps of: (A) melting 35-67 wt % of iron (Fe), 13-30 wt % of chromium (Cr), 15-30 wt % of nickel (Ni) and 5-15 wt % of aluminum (Al) to provide an ingot; (B) subjecting the ingot to hot rolling at 1050-1250° C.; (C) primarily heat treating the alloy subjected to hot rolling at 700-1200° C., followed by quenching; (D) subjecting the quenched alloy to cold rolling at room temperature; and (E) further heat treating the rolled alloy at 700-900° C., wherein the stainless steel has a structure including an austenite phase, ferrite phase and a NiAl(B2) phase.

First, in step (A), 35-67 wt % of iron (Fe), 13-30 wt % of chromium (Cr), 15-30 wt % of nickel (Ni) and 5-15 wt % of aluminum (Al) are melted to provide an ingot. Herein, at least three elements selected from niobium (Nb), manganese (Mn), carbon (C), silicon (Si), phosphorus (P) and sulfur (S) may be further added to obtain an ingot.

The ingot is obtained preferably by a vacuum induction melting (VIM) method. Particularly, the ingot is obtained by melting the elements by using a vacuum inducing melting (VIM) reactor under inert gas atmosphere of 500 torr or less at a melting temperature of 1150-1400° C. for 1-3 hours, and then quenched to provide the ingot in an amount of 40-50 kg. Then, solution annealing heat treatment is carried out at 1200-1300° C. for the purpose of casting structure destruction and microstructure homogenization and furnace cooling is performed. After that, the ingot is processed into a block shape for the subsequent rolling process.

Herein, it is preferred to repeat melting three to five times in order to prevent segregation of impurities or non-uniform distribution of the alloy composition in the ingot. In addition, considering a high aluminum content, it is possible to inhibit pore formation by limiting the tapping rate based on the volume to around 2 minutes after the molten metal treatment.

In addition, according to the present disclosure, solution annealing is carried out at 1200-1300° C. to obtain a solid solution of an austenite phase and ferrite phase with a NiAl(B2) phase and other compounds, such as a niobium compound.

Next, in step (B), the ingot obtained from step (A) is subjected to hot rolling at 1050-1250° C.

In step (B), the ingot is rolled at 1050-1250° C. under atmospheric environment to carry out hot rolling at a total reduction ratio of 70-90%.

Herein, when the temperature is not within the above-defined range during the hot rolling, it is not possible to ensure the austenite phase, ferrite phase and the NiAl(B2) phase at a desired volume ratio, even when using iron, chromium, nickel and aluminum in the amount disclosed herein. In addition, when the temperature is not within the above-defined range, product defects, such as non-uniform sheet thickness may be generated due to slip during the rolling process caused by a change in phase fraction and phase distribution and the aluminum solid-solution hardening effect.

After that, in step (C), the alloy subjected to hot rolling in step (B) is preliminarily heat treated at 700-1200° C. and then cooled.

The preliminary heat treatment is carried out to control the austenite phase, ferrite phase and NiAl(B2) phase. Particularly, heat treatment can form a solid solution of the NiAl(B2) phase at 1100-1200° C. and can increase the distribution of the austenite phase and the size of NiAl(B2) phase at 700-900° C. Such heat treatment may be applied selectively (or in a stepwise manner), and is preferably applied according to the purpose depending on the composition and microstructure.

Herein, the cooling condition includes quenching from the heat treatment temperature to room temperature (23-27° C.) using atmosphere, preferably water or oil, and can control the microstructure including the NiAl(B2) phase and crystal size and improve mechanical properties and fabricability for manufacturing a cladding subsequently. Herein, when the cooling rate is lower than the air cooling rate (e.g. furnace cooling), crystal size and NiAl(B2) phase distribution may be changed to cause reduction of ductility and degradation of fabricability.

After that, in step (D), the alloy quenched in step (C) is subjected to cold rolling at room temperature.

After carrying out washing with acid to remove the impurities and oxide layer on the heat treated alloy surface, cold rolling is carried out at room temperature to a total reduction ratio of 20-60%.

Then, in step (E), the rolled alloy is further heat treated at 700-900° C.

The heat treatment is carried out in order to remove stress from the rolled alloy or to control the austenite phase distribution and NiAl(B2) phase size. Herein, similarly to the preliminary heat treatment, the heat treatment condition is applied preferably according to the purpose depending on the composition and microstructure of the corresponding device.

Modes for Invention

Exemplary embodiments now will be described more fully hereinafter. However, the following examples are for illustrative purposes only and various changes and modifications may be made without departing from the spirit and scope of the present disclosure. In addition, various changes and modifications within the scope of the present disclosure as defined by the following claims will become apparent to those skilled in the art.

Example 1. Fe—Cr—Ni—Al Alloy

First, 46.67 wt % of iron (Fe), 23.64 wt % of chromium (Cr), 24.15 wt % of nickel (Ni), 5.54 wt % of aluminum (Al), and, based on 100 parts by weight of the combination of iron (Fe), chromium (Cr), nickel (Ni) and aluminum (Al), 0.48 parts by weight of Nb, 1.01 parts by weight of Mn, 0.12 parts by weight of C, 0.31 parts by weight of Si and 0.0080 parts by weight of Ti were melted by using a vacuum induction melting reactor under argon atmosphere of 450 torr at a melting temperature of 1300° C. for 2 hours. Then, 42 kg of the ingot were subjected to homogenization and solution annealing heat treatment in an air furnace at 1200° C. for 3 hours and then subjected to furnace cooling to obtain blocks having a thickness of 30 mm. After that, hot rolling was carried out at 1150° C. eight times to obtain an alloy having a thickness of 3 mm.

The rolled alloy was preliminarily heat treated at 1200° C. for 3 hours and quenched. Then, cold rolling was carried out to obtain a sheet-type alloy having a thickness of 1.2 mm, which, in turn, was exposed to further heat treatment at 900° C. for 1 hour. After that, air cooling was carried out to obtain stainless steel.

Example 2. Fe—Cr—Ni—Al Alloy

Example 1 was repeated to obtain stainless steel, except that 52.11 wt % of iron (Fe), 20.96 wt % of chromium (Cr), 21.48 wt % of nickel (Ni), 5.50 wt % of aluminum (Al), and based on 100 parts by weight of the combination of iron (Fe), chromium (Cr), nickel (Ni) and aluminum (Al), 0.52 parts by weight of Nb, 1.04 parts by weight of Mn, 0.12 parts by weight of C, 0.32 parts by weight of Si and 0.0056 parts by weight of Ti were used.

Example 3. Fe—Cr—Ni—Al Alloy

Example 1 was repeated to obtain stainless steel, except that 58.76 wt % of iron (Fe), 16.33 wt % of chromium (Cr), 18.77 wt % of nickel (Ni), 6.14 wt % of aluminum (Al), and based on 100 parts by weight of the combination of iron (Fe), chromium (Cr), nickel (Ni) and aluminum (Al), 0.53 parts by weight of Nb, 1.04 parts by weight of Mn, 0.11 parts by weight of C and 0.31 parts by weight of Si were used.

Example 4. Fe—Cr—Ni—Al Alloy

Example 1 was repeated to obtain stainless steel, except that 47.9 wt % of iron (Fe), 17.28 wt % of chromium (Cr), 28.69 wt % of nickel (Ni), 6.13 wt % of aluminum (Al), and based on 100 parts by weight of the combination of iron (Fe), chromium (Cr), nickel (Ni) and aluminum (Al), 0.56 parts by weight of Nb, 1.03 parts by weight of Mn, 0.11 parts by weight of C and 0.30 parts by weight of Si were used.

Example 5. Fe—Cr—Ni—Al Alloy

Example 1 was repeated to obtain stainless steel, except that 57 wt % of iron (Fe), 15 wt % of chromium (Cr), 20 wt % of nickel (Ni), 8 wt % of aluminum (Al), and based on 100 parts by weight of the combination of iron (Fe), chromium (Cr), nickel (Ni) and aluminum (Al), 0.5 parts by weight of Nb, 1 part by weight of Mn, 0.1 parts by weight of C and 0.3 parts by weight of Si were used.

Comparative Example 1. Commercially Available FeCrAl Alloy, Kanthal APM

A sheet-type (thickness 1.4 mm) commercially available stainless steel product having a single ferrite phase, Kanthal APM, used as a reference material for developing an accident-tolerant stainless steel (ATF FeCrAl) for a similar purpose in USA, was provided. The quantitatively analyzed chemical composition is shown in the following Table 1.

Comparative Example 2. Commercially Available Stainless Steel 310S

Among the commercially available stainless steel 300 series, 310S, typically known to form a Cr-rich oxide layer at high temperature by virtue of a high Cr content, was used. The quantitatively analyzed chemical composition is shown in the following Table 1.

Comparative Example 3. Low Al Content

Example 1 was repeated to obtain stainless steel, except that the balance amount of iron (Fe), 16.2 wt % of chromium (Cr), 18.3 wt % of nickel (Ni), 4.93 wt % of aluminum (Al), and based on 100 parts by weight of the combination of iron (Fe), chromium (Cr), nickel (Ni) and aluminum (Al), 1.39 parts by weight of Nb, 1.22 part by weight of Mn, 0.11 parts by weight of C and 0.34 parts by weight of Si were used.

Comparative Example 4. Different Method for Manufacturing Fe—Cr—Ni—Al Alloy

Example 1 was repeated to obtain stainless steel, except that the preliminary heat treatment was not used after the hot rolling.

The following Table 1 shows the chemical composition values of the alloys according to Examples and Comparative Examples, as determined by inductively coupled plasma-atomic emission spectrometry (ICP-AES) analysis. In addition, each sample was designated as its heat number (HT #) for convenience identification of the heat treatment condition thereof.

stainless steel which has a multiplex structure but does not satisfy a desired volume ratio of three phases.

TEST EXAMPLES

Test Example 1. Microstructural SEM/BSE and STEM/EDS Analysis

Figure 2:
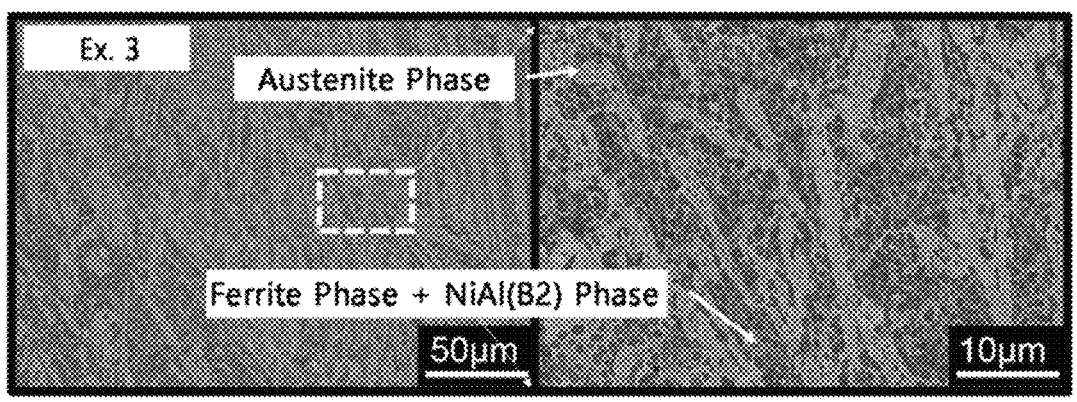
FIG. 2 is a photographic image of the microstructural surface of the stainless steel according to Example 3, taken by SEM/BSE.
Figure 3:
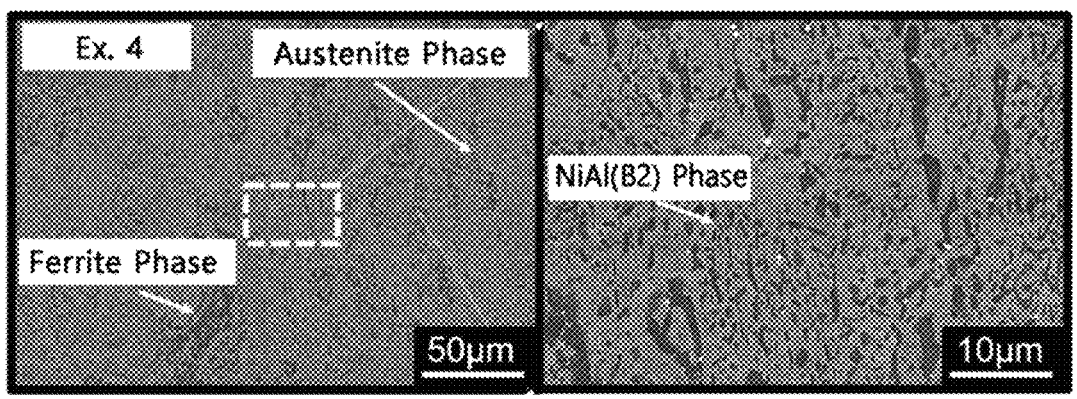
FIG. 3 is a photographic image of the microstructural surface of the stainless steel according to Example 4, taken by SEM/BSE.

FIG. 1 is a photographic image of the microstructural surface of the stainless steel according to Example 1, taken by scanning electron microscopy (SEM)/back scattered electron detector (BSE), FIG. 2 is a photographic image of the microstructural surface of the stainless steel according to Example 3, taken by SEM/BSE, and FIG. 3 is a photographic image of the microstructural surface of the stainless steel according to Example 4, taken by SEM/BSE.

As shown in FIG. 1 and FIG. 2, each Fe—Cr—Ni—Al alloy according to Examples 1 and 3 has a multiplex structure in which an austenite phase marked by a light gray colored portion, a ferrite phase marked by a dark gray colored portion and a NiAl phase (B2) including nickel (Ni) and aluminum (Al) and marked by a round shape with a black shadow are present in combination.

As shown in FIG. 3, the Fe—Cr—Ni—Al stainless steel according to Example 4 also has a multiplex structure in which an austenite phase, a ferrite phase and a NiAl(B2) phase are present in combination.

Figure 4:
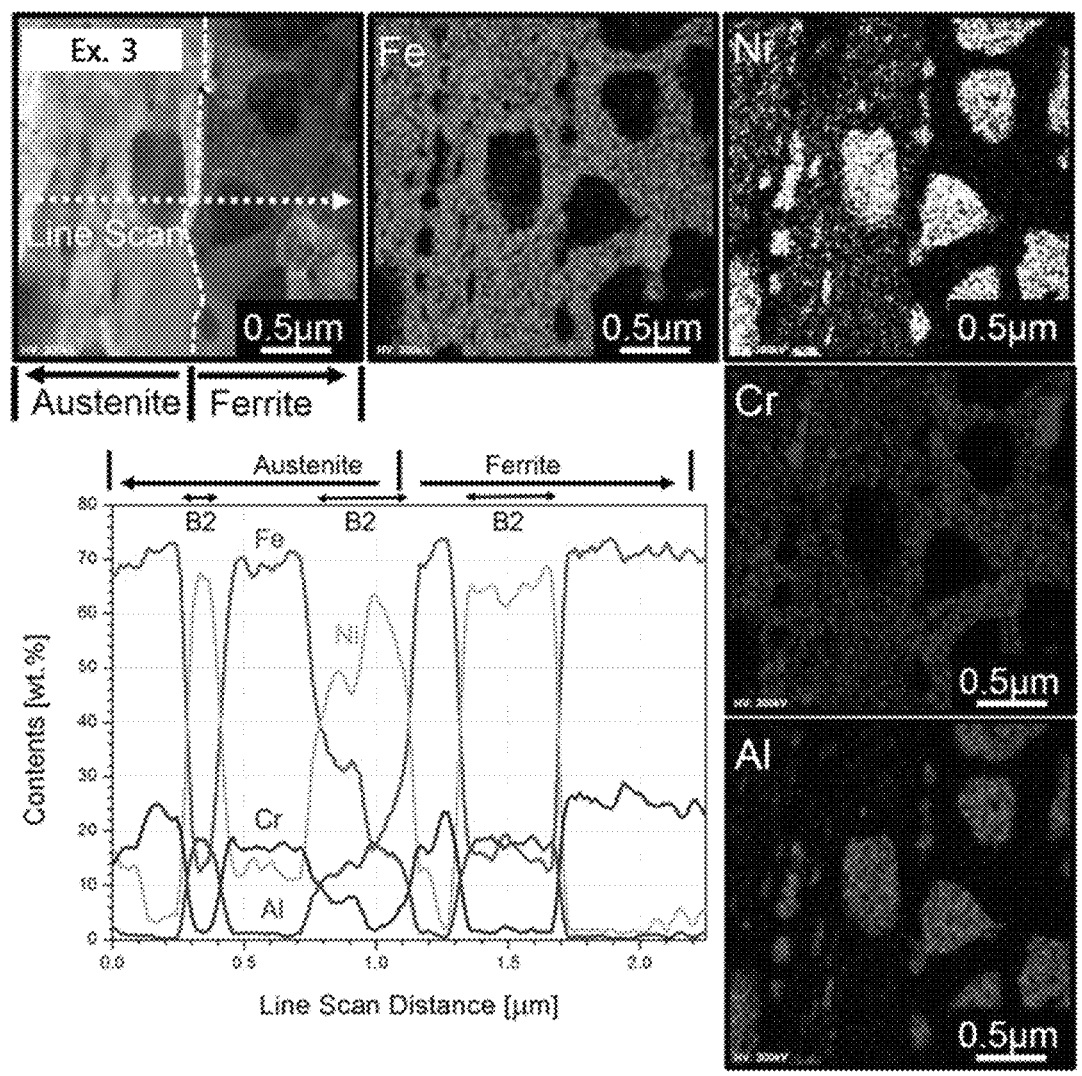
FIG. 4 shows a scanning transmission electron microscopic (STEM) image of the main elements (Fe, Cr, Ni and Al) of the stainless steel according to Example 3 and the results of energy dispersive X-ray spectroscopy (EDS) line scan/mapping analysis thereof.

FIG. 4 shows a scanning transmission electron microscopic (STEM) image of the main elements (Fe, Cr, Ni and Al) of the stainless steel according to Example 3 and the results of energy dispersive X-ray spectroscopy (EDS) line scan/mapping analysis thereof.

As shown in FIG. 4, the Fe—Cr—Ni—Al alloy according to Example 3 has a multiplex structure in which a Fe- and Ni-rich austenite phase, relatively Ni-depleted and Cr-rich ferrite phase and a round shaped Ni- and Al-rich NiAl phase (B2) are present in combination.

Example 2. Determination of Change in Weight and Oxide Layer Thickness after Exposure to High-Temperature Steam at 1200° C.

To carry out a high-temperature steam oxidation test expected upon an accident in a nuclear power plant, each

TABLE 1

| | Chemical Composition (wt %) | | | | | | | | |
|---|---|---|---|---|---|---|---|---|---|
| | Fe | Ni | Cr | Al | Nb | Mn | C | Si | Ti | HT# |
| Ex. 1 | Bal. | 24.15 | 23.64 | 5.54 | 0.48 | 1.01 | 0.12 | 0.31 | 0.008 | B31CRFA |
| Ex. 2 | Bal. | 21.48 | 20.96 | 5.50 | 0.52 | 1.04 | 0.12 | 0.32 | 0.006 | B32CRFA |
| Ex. 3 | Bal. | 18.7 | 16.3 | 6.14 | 0.53 | 1.04 | 0.11 | 0.31 | — | B51CRFA |
| Ex. 4 | Bal. | 28.6 | 17.2 | 6.13 | 0.56 | 1.03 | 0.11 | 0.30 | — | B52CRFA |
| Ex. 5 | Bal. | 20 | 15 | 8 | 0.5 | 1 | 0.1 | 0.3 | — | B62Model |
| Comp. Ex. 1 | Bal. | — | 21.9 | 5.81 | — | 0.16 | 0.03 | 0.28 | 0.038 | APM |
| Comp. Ex. 2 | Bal. | 19.1 | 24.7 | — | — | 0.87 | 0.06 | 0.69 | — | 310S |
| Comp. Ex. 3 | Bal. | 18.3 | 16.2 | 4.93 | 1.39 | 1.22 | 0.11 | 0.34 | 0.003 | B11CR |
| Comp. Ex. 4 | Bal. | 24.15 | 23.64 | 5.54 | 0.48 | 1.01 | 0.12 | 0.31 | 0.008 | B31Model |

It can be seen that each alloy according to Examples 1-5 has a multiplex structure, while Comparative Example 1 is stainless steel having a single ferrite phase containing aluminum, Comparative Example 2 is stainless steel having a single austenite phase containing no aluminum, Comparative Example 3 is duplex stainless steel including ferrite and austenite stainless steel, and Comparative Example 4 is stainless steel was processed into a coupon shape having a diameter of 15 mm and a thickness of 1 mm through electric discharge machining (EDM), was subjected to mechanical polishing with silicon carbide (SiC) paper of 1200 grits, and then was washed with distilled water. Each stainless steel according to Examples and Comparative Examples was exposed to steam environment at 1200° C. for 8 hours and was analyzed by using a thermal gravimetric analyzer (TGA). STA 449-F3 model available from NetZsch Co. was used to introduce a mixed gas containing argon and steam at a volume ratio of 6:4 under ambient pressure at 600° C. with a flow rate of 1.12 mg·cm$^{-2}$·s$^{-1}$. Then, each sample was heated to 1200° C. at a rate of 20° C./min and exposed to 1200° C. for 8 hours. Herein, a decrease/increase in weight was recorded by using XX39 model available from Sartorius Co. with an accuracy of 0.01 mg/cm$^2$. The values shown in the following Table 2 are increments in weight before and after the TGA exposure and thickness measurements of the oxide layer sections determined by using a focused ion beam (FIB) system.

TABLE 2

|  | Increment in weight (mg/cm$^2$) | Average oxide layer thickness (μm) |
|---|---|---|
| Ex. 1 | 2 | 15 |
| Ex. 2 | 2.5 | 20 |
| Ex. 3 | 1.45 | 12 |
| Ex. 4 | 1.94 | 14 |
| Ex. 5 | 1.25 | 10 |
| Comp. Ex. 1 | 0.8 | 7 |
| Comp. Ex. 2 | 2.96 | 25 |
| Comp. Ex. 3 | 6.65 | 45 |
| Comp. Ex. 4 | 3.15 | 25 |

As shown in Table 2, each stainless steel according to Examples 1-5 shows a smaller increment in weight even after the exposure to steam at high temperature for a long time as compared to Comparative Example 1. Thus, it can be seen that the stainless steel has excellent oxidation resistance under steam environment at high temperature. In other words, the stainless steel minimizes wall-thinning caused by steam oxidation at high temperature upon a serious accident and delays a time required for reaching exposure to radiation caused by rapid melting, thereby providing improved accident tolerance.

On the contrary, each stainless steel according to Comparative Examples 2-4 shows a significantly larger increment in weight as compared to Examples 1-5. Particularly, Comparative Examples 3 including aluminum in an amount lower than the aluminum content disclosed herein shows a significantly high increment in weight. In the case of Comparative Example 4, it has the same composition as Example 1 but is obtained by a different manufacturing method, and thus shows a larger increment in weight. This suggests that stainless steel satisfying both the composition and manufacturing method disclosed herein can ensure excellent steam corrosion resistance at high temperature.

Test Example 3. Structural Analysis for Oxide Layer after Exposure to Steam at High Temperature of 1200° C.

Figure 5:
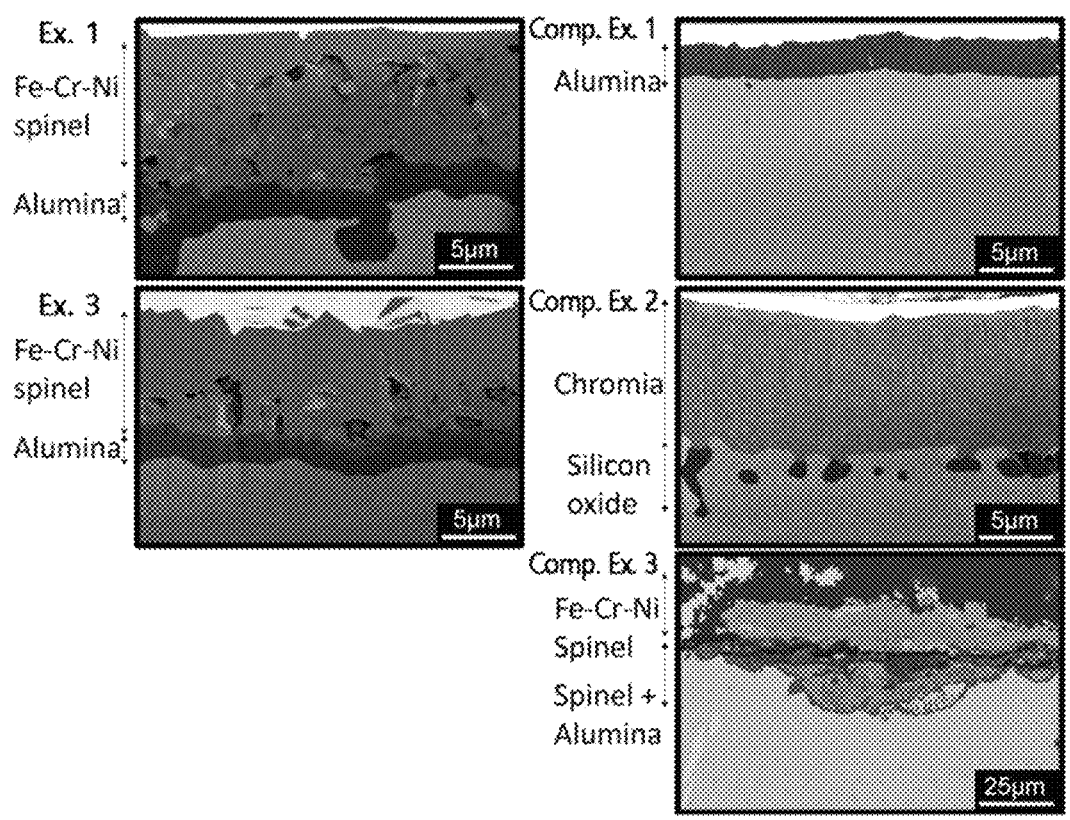
FIG. 5 shows 52°-tilted photographic images of the oxide layers formed by exposing the stainless steel according to each of Example 1, Example 3 and Comparative Examples 1-3 to water steam at 1200° C. for 8 hours, taken by focused ion beam (FIB)/scanning electron microscopy (SEM).

FIG. 5 shows 52°-tilted photographic images of the oxide layers formed by exposing the stainless steel according to each of Example 1, Example 3 and Comparative Examples 1-3 to water steam at 1200° C. for 8 hours, taken by focused ion beam (FIB)/scanning electron microscopy (SEM). The same samples as Examples and Comparative Examples corresponding to Table 2 were used herein.

As shown in FIG. 5, the stainless steel according to Example 3 forms a surface oxide layer having a total thickness of 12 μm (10 μm Fe, Ni, Cr spinel oxide layer and 2 μm alumina oxide layer), after allowing it to stand under stem at 1200° C. for 8 hours. Particularly, while Comparative Example 1 which is commercially available FeCrAl alloy having the highest high-temperature oxidation resistance forms alumina to 3 μm, the stainless steel according to Comparative Example 2 forms a Cr-rich surface oxide layer in combination with silicon dioxide (SiO$_2$) to 20 μm toward the inside of the base. It is observed that the stainless steel according to Comparative Example 3 containing aluminum in an amount less than the lower limit disclosed herein forms a thick and very unstable oxide layer structure. This is because the stainless steel is vulnerable to an accident condition (high-temperature steam oxidation) in a nuclear power plant.

Although each stainless steel according to Examples 1-5 forms an oxide layer having a thickness of 10-20 μm, which is larger than the thickness of Comparative Examples 1 forming a single Al-rich oxide layer, each stainless steel forms a stable alumina oxide layer in its inner materials and interface. This suggests that Examples 1-5 have higher high-temperature oxidation resistance as compared to Comparative Example 2 forming a Cr-rich oxide layer and Comparative Examples 3 and 4 forming a thick (Fe, Cr, Ni)-rich oxide layer on the surface thereof.

Figure 6:
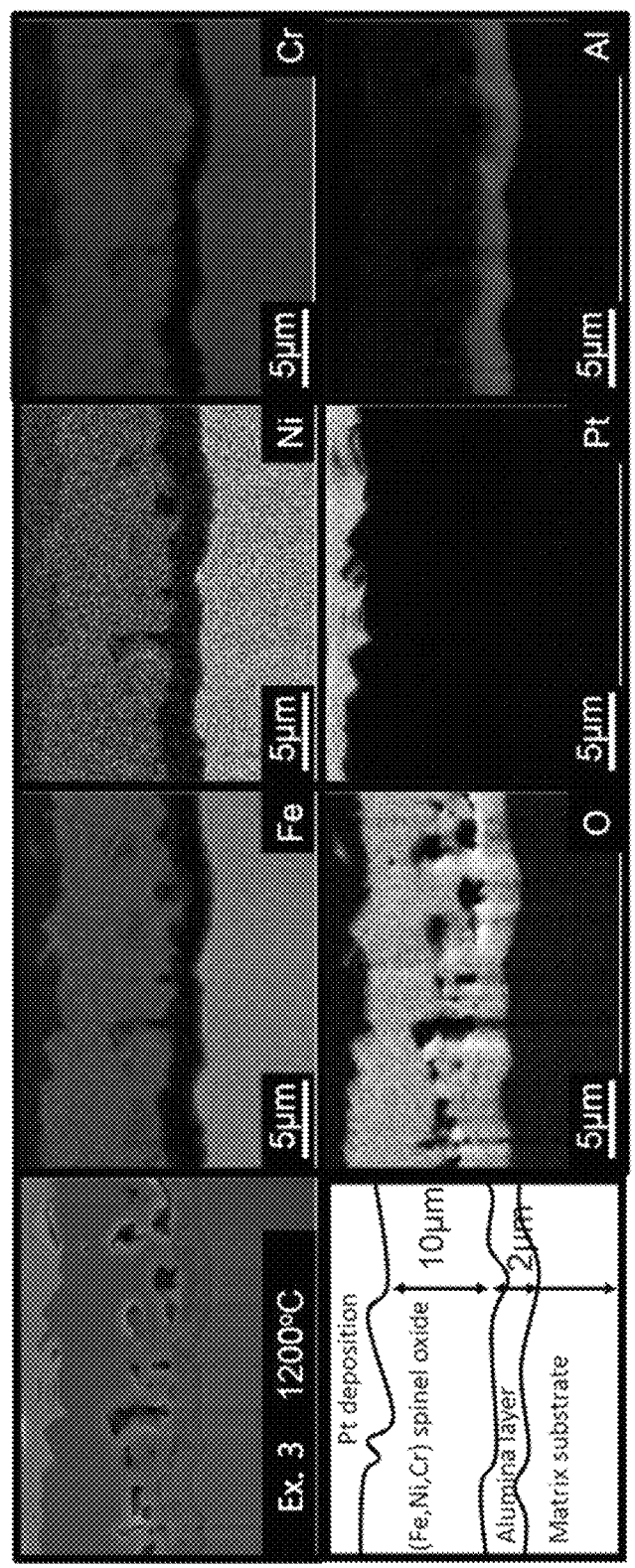
FIG. 6 shows a STEM image of the section of the oxide layer formed by exposing the stainless steel according to Example 3 to water steam at 1200° C. for 8 hours, EDS element mapping analysis results thereof, and the schematic view of the oxide layer structure.

FIG. 6 shows a STEM image of the section of the oxide layer formed by exposing the stainless steel according to Example 3 to water steam at 1200° C. for 8 hours, EDS element mapping analysis results thereof, and the schematic view of the oxide layer structure.

As shown in FIG. 6, after carrying out an oxidation test at 1200° C. for 8 hours corresponding to the high-temperature steam environment expected upon an accident in a nuclear power plant for 8 hours, the stainless steel according to Example 3 forms a protective oxide layer having a specific structure. Particularly, the surface film is a (Fe, Cr, Ni)-rich oxide layer having a spinel structure and a thickness of about 10 μm and the interface with the inner materials is a stable Al-rich oxide layer having a thickness of 2 μm.

Test Example 4. Determination of Micro-Tensile Properties—Yield Strength, Tensile Strength and Elongation To carry out a micro-tensile test at room temperature, each stainless steel according to Examples and Comparative Examples was prepared in the form of a sheet-type micro-tensile sample (5 types, 3 samples of each type) having a length of 16 mm and a thickness of 0.5 mm (gauge width/length: 1.2/6 mm). The tensile test was carried out with a strain of 3.33×10$^{-4}$ sec$^{-1}$ (cross-head speed 0.1 mm/min). The load/displacement (N/mm) test values obtained from the test were converted into a stress-strain curve (MPA/%) and the curve was used to calculate the yield strength, tensile strength and elongation of the corresponding material. The following Table 3 shows the average value of yield strength, tensile strength and elongation, and a range of values including the standard deviation of the average value.

TABLE 3

|  | Yield strength (0.2% offset) (MPa) | Tensile strength (MPa) | Elongation (%) |
|---|---|---|---|
| Example 1 | 1041-1051 | 1330-1336 | 12.0-13.2 |
| Example 2 | 1015-1026 | 1248-1264 | 12.9-14.9 |
| Example 3 | 809-925 | 1091-1167 | 18.1-19.5 |

TABLE 3-continued

| | Yield strength (0.2% offset) (MPa) | Tensile strength (MPa) | Elongation (%) |
|---|---|---|---|
| Example 4 | 829-851 | 1122-1142 | 20.1-26.9 |
| Example 5 | 830-940 | 1090-1180 | 17-24 |
| Comp. Ex. 1 | 509-547 | 685-711 | 11.3-12.5 |
| Comp. Ex. 2 | 291-307 | 565-595 | 50.8-53.0 |
| Comp. Ex. 3 | 790-850 | 1095-1125 | 18.0-21.0 |
| Comp. Ex. 4 | 1009-1052 | 1322-1352 | 11.2-14.8 |

As shown in Table 3, each stainless steel according to Examples 1-5 shows a higher yield strength and tensile strength as compared to Comparative Examples 1-3, and has a higher elongation as compared to Comparative Examples 1-4. This demonstrates that the stainless steel according to the present disclosure has high toughness. In other words, the stainless steel according to the present disclosure has excellent fabricability required essentially for the manufacture of a thin nuclear fuel cladding.

Test Example 5. Surface Oxide Layer Analysis after Exposure to Normal Operation Environment in Pressurized Light Water Reactor To simulate the primary environment of a pressurized light water reactor, a sample processed into a coupon-like shape having a diameter of 15 mm and a thickness of 1 mm through electric discharge machining (EDM), subjected to mechanical polishing with silicon carbide (SiC) paper of 1200 grits and washed with distilled water was exposed to the environment of a closed loop-type system, in which water chemistry (pH 7.1), temperature (360° C.), pressure (190 bar) and dissolved oxygen (3 ppm) are controlled, for 45 days (1080 hours).

Figure 7:
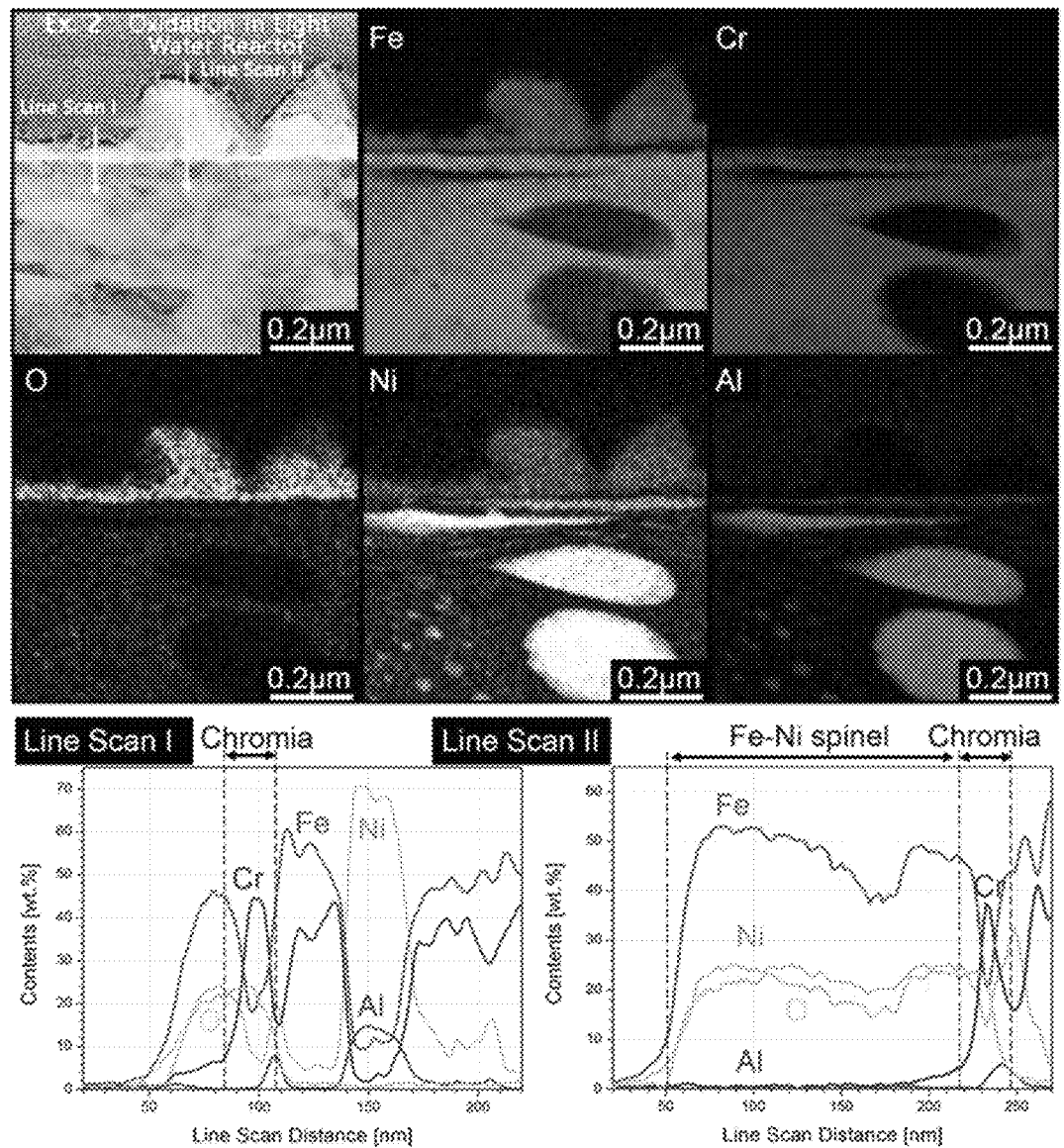
FIG. 7 shows a STEM image of the section of the stainless steel after exposing the alloy according to Example 2 at 360° C./190 bar for 45 days (1080 hours), EDS line scan/mapping analysis results thereof, and the schematic view thereof.

FIG. 7 shows a STEM image of the section of the stiles steel after exposing the alloy according to Example 2 at 360° C./190 bar for 45 days (1080 hours), EDS line scan/mapping analysis results thereof, and the schematic view thereof.

As shown in FIG. 7, the alloy according to Example 2 forms a continuous Cr-rich oxide layer on the surface under normal operation environment, and thus is expected to show excellent oxidation behavior as a cladding in a reactor core even during the long-time operation. Since the Fe—Cr—Ni—Al stainless steel alloy according to the present disclosure has a corrosion behavior similar to the corrosion behavior of the conventional stainless steel, it can provide anticorrosive property equal to or higher than that of the conventional zirconium cladding.

INDUSTRIAL APPLICABILITY

The stainless steel for an accident-tolerant light water reactor core material according to the present disclosure forms a stable oxide layer containing alumina under high-temperature steam environment expected upon an accident in a nuclear power plant, and thus can provide excellent accident tolerance. In addition, the stainless steel according to the present disclosure can provide high integrity as a structure by virtue of excellent mechanical properties including high strength, and thus can be used not only for a raw material for a nuclear power plant but also for various industrial fields requiring stainless steel.

The invention claimed is:

1. An Fe—Cr—Ni—Al multiplex stainless steel which comprises 35-67 wt % of iron (Fe), 13-30 wt % of chromium (Cr), 15-30 wt % of nickel (Ni) and 5-15 wt % of aluminum (Al), and has a structure comprising an austenite phase, ferrite phase and a NiAl(B2) phase;
    wherein the austenite phase, ferrite phase and the NiAl (B2) phase have a volume ratio of 1:0.1-1.5:0.1-1.0;
    wherein the volume ratio of the austenite phase to the volume ratio to the combined phase of the ferrite phase and the NiAl(B2) phase [ferrite phase+NiAl(B2) phase] is 1:1.0-1.5; and
    wherein the Fe—Cr—Ni—Al multiplex stainless steel is subjected to hot rolling, heat treatment at 700-1200° C. and cooling during manufacture of the Fe—Cr—Ni—Al multiplex stainless steel,
    wherein the Fe—Cr—Ni—Al multiplex stainless steel has a yield strength ranging from about 810 MPa to about 1050 MPa; and
    wherein when the Fe—Cr—Ni—Al multiplex stainless steel is exposed to a high temperature steam environment, the Fe—Cr—Ni—Al multiplex stainless steel forms an oxide layer having a thickness between 10 and 20 μm.

2. The Fe—Cr—Ni—Al multiplex stainless steel according to claim 1, which comprises aluminum in an amount of 5.5-15 wt %.

3. The Fe—Cr—Ni—Al multiplex stainless steel according to claim 1, which further comprises at least three elements selected from the group consisting of 0.1-2 parts by weight of niobium (Nb), 0.03-0.2 parts by weight of carbon (C), 0.1-2 parts b, 0.1-1.0 parts by weight of silicon (Si), 0.01 parts by weight or less of phosphorus (P) and 0.01 parts by weight or less of sulfur (S), based on 100 parts by weight of the combination of iron (Fe), chromium (Cr), nickel (Ni) and aluminum (Al).

4. The Fe—Cr—Ni—Al multiplex stainless steel according to claim 1, having a tensile strength ranging from about 1090 MPa to about 1335 MPa.

5. The Fe—Cr—Ni—Al multiplex stainless steel according to claim 1, having an elongation ranging from about 12% to about 27%.

6. A method for manufacturing the Fe—Cr—Ni—Al multiplex stainless steel for an accident-tolerant light water reactor core material according to claim 1, the method comprising the steps of:
    (A) melting 35-67 wt % of iron (Fe), 13-30 wt % of chromium (Cr), 15-30 wt % of nickel (Ni) and 5-15 wt % of aluminum (Al) to provide an ingot;
    (B) subjecting the ingot to hot rolling at 1050-1250° C.;
    (C) primarily heat treating the alloy subjected to hot rolling at 700-1200° C., followed by quenching;
    (D) subjecting the quenched alloy to cold rolling at room temperature; and
    (E) further heat treating the rolled alloy at 700-900° C., wherein the stainless steel has a structure comprising an austenite phase, ferrite phase and a NiAl(B2) phase.

7. The method for manufacturing Fe—Cr—Ni—Al multiplex stainless steel for an accident-tolerant light water reactor core material according to claim 6, wherein the ingot is obtained by adding at least three elements selected from the group consisting of 0.1-2 parts by weight of niobium (Nb), 0.1-2 parts by weight of manganese (Mn), 0.03-0.2 parts by weight of carbon (C), 0.1-1.0 parts by weight of silicon (Si), 0.01 parts by weight or less of phosphorus (P) and 0.01 parts by weight or less of sulfur (S), based on 100 parts by weight of the combination of iron (Fe), chromium (Cr), nickel (Ni) and aluminum (Al), in step (A).

8. An Fe—Cr—Ni—Al multiplex stainless steel which comprises 35-67 wt % of iron (Fe), 13-30 wt % of chromium (Cr), 18-30 wt % of nickel (Ni) and 5-15 wt % of aluminum (Al), and has a structure comprising an austenite phase, ferrite phase and a NiAl(B2) phase;
- wherein the austenite phase, ferrite phase and the NiAl(B2) phase have a volume ratio of 1:0.1-1.5:0.1-1.0;
- wherein the volume ratio of the austenite phase to the volume ratio to the combined phase of the ferrite phase and the NiAl(B2) phase [ferrite phase+NiAl(B2) phase] is 1:1.0-1.5; and
- wherein the Fe—Cr—Ni—Al multiplex stainless steel is subjected to hot rolling, heat treatment at 700-1200° C., and cooling during manufacture of the Fe—Cr—Ni—Al multiplex stainless steel,
- wherein the Fe—Cr—Ni—Al multiplex stainless steel:
  - has a yield strength ranging from about 810 MPa to about 1050 MPa;
  - has a tensile strength ranging from about 1090 MPa to about 1335 MPa;
  - has an elongation ranging from about 12% to about 27%; and
- wherein when the Fe—Cr—Ni—Al multiplex stainless steel is exposed to a high temperature steam environment, the Fe—Cr—Ni—Al multiplex stainless steel forms an oxide layer having a thickness between 10 and 20 μm.

* * * * *